United States Patent
Dorica et al.

[11] Patent Number: 5,976,375
[45] Date of Patent: Nov. 2, 1999

[54] PROCESS FOR REDUCING PRODUCTION OF BIOMASS DURING ACTIVATED SLUDGE TREATMENT OF PULP AND PAPER MILL EFFLUENTS

[75] Inventors: Joseph G. Dorica, Pointe Claire; Allan R. Elliott, Chateauguay, both of Canada

[73] Assignee: Pulp and Paper Research Institute of Canada, Pointe Claire, Canada

[21] Appl. No.: 09/281,790

[22] Filed: Mar. 31, 1999

Related U.S. Application Data

[60] Provisional application No. 60/080,556, Apr. 3, 1998.

[51] Int. Cl.$^6$ .............................. C02F 3/12; C02F 11/02
[52] U.S. Cl. ......................... 210/610; 210/625; 210/631; 210/928; 162/29
[58] Field of Search ................... 210/605–612, 210/623–628, 631, 928; 162/29, 30.1, 30.11, 33

[56] References Cited

U.S. PATENT DOCUMENTS

| | | |
|---|---|---|
| 3,235,487 | 2/1966 | Westgarth .................... 210/6 |
| 3,718,582 | 2/1973 | Smith et al. ................... 210/6 |
| 3,737,374 | 6/1973 | Stern et al. .................. 210/928 |
| 3,746,639 | 7/1973 | Bewley et al. ............... 210/928 |
| 4,173,531 | 11/1979 | Mintsch et al. ............... 210/5 |
| 4,183,808 | 1/1980 | Drnevih ....................... 210/5 |
| 4,490,257 | 12/1984 | Becker ....................... 210/610 |
| 4,915,840 | 4/1990 | Rozich et al. ............... 210/605 |
| 4,956,094 | 9/1990 | Levin et al. ................ 210/625 |
| 5,002,633 | 3/1991 | Maxham ..................... 210/631 |
| 5,128,040 | 7/1992 | Molof et al. ................ 210/605 |
| 5,137,636 | 8/1992 | Bundgaard .................. 210/605 |
| 5,143,619 | 9/1992 | Vipat ......................... 210/624 |
| 5,174,898 | 12/1992 | Stuckmann et al. ........ 210/609 |
| 5,705,073 | 1/1998 | Loquenz et al. ........... 210/631 |

OTHER PUBLICATIONS

Ultimate Disposal of Biological Sludges—a Novel Concept, Lee et al, pp. T104–T110.

Activated Sludge Treatment of Market Sulphite Pulp and Newsprint Mill Effluent at Stora Forest I Industries Limited, Lamorie et al, 78$^{th}$ Annual Meeting, Technical Section, CPPA, A315–A316.

Aerated Lagoon Treatment System Upgrade, Lee Jr. et al, 1985 Environmental Conference, pp. 97–100.

Feasibility Study of Sludge Lysis and Recycle in the Activated Sludge Process, Springer et al, 1993 Environmental Conference, pp. 761–771.

*Primary Examiner*—Thomas G. Wyse
*Attorney, Agent, or Firm*—Swabey Ogilvy Renault

[57] ABSTRACT

A process for reducing the production of biomass during activated sludge treatment of pulp and paper mill effluents, involving a conditioning of the recycled activated sludge (RAS) prior to its return into the aeration tank is described. The conditioning is typically performed within the sludge return line and involves RAS exposure to a waste acidic effluent originating from bleach plants of kraft, sulphite mills or other mill sources.

12 Claims, 4 Drawing Sheets

PROCESS FOR REDUCING PRODUCTION OF BIOMASS DURING ACTIVATED SLUDGE TREATMENT OF PULP AND PAPER MILL EFFLUENTS

CROSS REFERENCE TO RELATED APPLICATION

This application is related to U.S. application Ser. No. 60/080,556 filed Apr. 3, 1998, and the benefit under 35 U.S.C. 119(e) of such U.S. Application is claimed.

BACKGROUND OF THE INVENTION

1. Field of Invention

The present invention relates to the reduction of biomass production during activated sludge treatment of pulp and paper mill effluents. The present invention further relates to conditioning the activated sludge with an acid effluent.

2. Description of Prior Art

Biological sludge is an activated sludge produced by degradation and biosynthesis of dissolved organics, is known to be viscous and difficult to dewater. The present practice in mill sludge dewatering is to combine the biological or secondary sludge with the fibrous primary sludge, in order to improve dewatering rate and dryness of sludge cake. Decreases in primary sludge generation at the mill through improved reclamation of rejects, as well as the extensive use of activated sludge treatment systems in the industry, have resulted in an overall decrease in the weight proportion of primary to secondary sludge. This adversely affects efficiency of the dewatering process.

A pulp mill producing 750 tons of pulp per day will typically have a total effluent flow of 25 million US gallons/day which would produce 250,000 US gallons of sludge having a consistency of 1%, and requiring dewatering and disposal.

Sludge handling and disposal represent a substantial part of the activated sludge treatment costs. Approaches to reduce sludge production might include manipulation of the food to microorganisms (F/M) ratio and/or sludge retention time (SRT) in the biological system. For instance, pilot plant studies with bleached sulphite/groundwood effluent showed that about 60% of the BOD removed was converted to biomass when the activated sludge plant was operated at SRT between 4 and 5 days, as described by Lamorie, J. et al., "Activated Sludge Treatment of Market Sulphite and Newsprint Effluent at Stora Forest Industries Limited", Proceed. 1990 CPPA/TS Annual Meeting, Montreal, Quebec, January 1992. The subsequent adjustment to an extended aeration mode (SRT, 20 days) reduced biomass production by half (BOD conversion to sludge, 30%). However, in most cases the activated sludge plants are not designed to operate at high SRT. The disadvantages of such operation are low settleability of sludge and a potential for development of filamentous growth.

Degree of sludge biosynthesis can also be affected by the effluent composition. It was observed by Lee et al., Aerated Lagoon Treatment Upgrade, Proceed. 1985 TAPPI Environ. Conf., Mobile, Ala., April 1985, p. 97, that the biosynthesis coefficient decreased historically from 0.40 to 0.24 kg sludge/kg BOD removed, as a result of lesser availability of low-molecular weight carbohydrates due to an improved collection of black liquor at a bleached kraft mill.

Sludge lysis by mechanical means has been recently studied by Springer et al., Feasibility Study of Sludge Lysis and Recycle in the Activated Sludge Process, Proceed. 1993 TAPPI Environ. Conf., Boston, Mass., March 1993, p. 761. This approach is based on high-shear disintegration of waste activated sludge (WAS), in order to break the cell membranes and convert a part of the biomass into soluble substrate. The lysed sludge was to be returned into the aeration basin to redigest the released BOD components. When operated in extended aeration mode, the proposed process was expected to operate free of excess sludge. In terms of operating costs, Springer et al. estimated savings of about 30%, compared to a conventional activated sludge plant. A possible drawback of this process might be the formation of non-biodegradable cell debris which could be difficult to clarify in the subsequent biosynthesis stage. Consequently, elevated levels of COD in the treated effluent could occur.

A complete sludge digestion of WAS especially under alkaline conditions at elevated temperatures and pressures has been described by Lee, E. G., et al., Pulp Pap. Can., 77(6), 88 (1976). The process has yet not been used on a full scale.

Anoxic zones have been used as complementary treatment stages during the treatment of municipal wastewater. In practical terms this is achieved by splitting the aeration into two or more oxic stages, which allows for insertion of one or more anoxic i.e. non-aerated stages. For example, ammonia can be removed from municipal wastewater by a nitrification-denitrification processes which alternates oxic and anoxic treatment conditions as described in U.S. Pat. Nos. 4,173,531 and 5,137,636. Such treatments were also found effective at removing phosphate as described in U.S. Pat. No. 4,183,808. Phosphate can be also removed by air stripping of biological sludge in the activated sludge process as described in U.S. Pat. No. 4,956,094. The exposure of wastewater to anoxic and anaerobic conditions has been shown to enhance BOD and TSS removal in U.S. Pat. No. 5,128,040. UV irradiation has been proposed for sterilization of effluent streams in U.S. Pat. No. 5,174,898. However, the above uses of anoxic stages, as well as UV irradiation pertain to the improvement of municipal wastewater treatment efficiency, rather than to the reduction of sludge generation by the activated sludge process.

A process using intense aerobic/anaerobic digestion (HRT of 30 days, thermophilic temperatures) to hydrolyse a portion of waste primary and secondary sludge has been described in U.S. Pat. No. 4,915,840. This process aims to reduce the total mass of waste sludge by recycling the hydrolysed fraction of WAS back to the activated sludge process.

An exposure of the RAS to anaerobic environment for a period between 1–7 hours has been found to significantly reduce the WAS fraction in an activated sludge process in U.S. Pat. No. 3,235,487. The application of UV irradiation in a sludge biolysis unit to reduce the amount of biological sludge has been proposed in U.S. Pat. No. 3,591,491. A modification of the latter patent, using heat or vacuum instead of UV irradiation, has been described in U.S. Pat. No. 3,718,582.

SUMMARY OF THE INVENTION

It is an object of this invention to provide a method of treating sludge from a pulp mill or paper mill effluent to reduce the content of insoluble solids.

It is a particular object of the invention to provide a method which can reduce the tonnage of biological sludge generated in an activated sludge plant.

Broadly, the present invention relates to a method which involves in-line conditioning of recycled activated sludge (RAS), typically in the sludge return line, with an acidic pulp or paper mill effluent.

In accordance with the invention there is provided in a process of treating activated sludge in which a solids-containing pulp or paper mill effluent is charged to a primary clarifier to remove suspended solids with production of a clarified effluent, the clarified effluent is subjected to microbial digestion in a digestion vessel, a digestion effluent from said vessel is clarified and sludge from the clarification is recycled along a recycle line to said digestion vessel, the improvement in which an acidic pulp or paper mill effluent is added to said sludge in said recycle line.

DETAILED DESCRIPTION OF THE INVENTION

The acidic effluent employed in the process of the invention may, in particular, be an acidic effluent from a bleaching stage in a kraft or sulphite pulp mill.

Typically, such effluents have a pH of 1 to 3 and when added to the sludge in the recycle line, produces a pH of 3 to 6 in the sludge, depending on the flow rate.

In general, the combined sludge and acidic effluent is at a temperature of 35 to 50° C., and the acidic effluent provides chlorine dioxide or chlorine dioxide and chlorine remaining in the effluent when it is removed from the bleaching process.

The acidic effluent and activated sludge are suitably maintained in contact in the recycle line for a period of 2 to 40 minutes. At high temperatures and low pH shorter contact times are required than at higher pH and lower temperature.

The microbial digestion is suitably aerobic and is carried out at neutral pH with addition of oxygen as oxygen gas or air to meet the BOD of the microbial mass in the digestion. Alkali is added to render the aqueous mix in the digestion stage neutral.

The acidic effluent is typically acidic as recovered from the pulp or paper mill, for example, as acidic bleach effluent, but may also be an alkaline effluent rendered acidic by addition of an acid, for example, a mineral acid such as sulphuric acid.

The acidic effluent provides a conditioning by the in-line mixing of the acidic effluent with the recycled activated sludge. The exposure of the RAS to elevated temperatures, the low pH values of the acidic effluent which are typically 3 to 6, and destabilizing agents found in the effluent, results in a reduction in sludge production.

The underlying operation during the acidic conditioning of the RAS is (i) suppression of cell growth, (ii) rendering of a part of the viable cells to a non-viable form and (iii) conversion of the non-viable cells to dissolved or soluble substrate, which is then reincorporated into biomass in the digestion vessel.

The process is carried out so that the activated sludge in the microbial digestion remains viable and able to perform the digestion. In general the acidic conditioning results in 20 to 40%, by weight, of the viable cells in the recycle line being rendered non-viable. This results in a wastage rate of WAS that is 20 to 40%, by weight, of the conventional wastage of WAS, to maintain the required level of solids in the digestion stage.

The activated sludge may be continually or continuously cycled from the digestion vessel along the recycle line as recycled activated sludge and back to the digestion vessel for treatment of the sludge.

The advantages of such cyclical conversion are evident from the analysis of the biochemical processes involved. During each cycle, a substantial part of the bacterial substrate is converted to energy, carbon dioxide and water and thus a net reduction in overall sludge yields is attained. The sludge solubilization also results in release of nutrients ($NH_3$ and phosphate) which reflects positively in the chemical cost of the treatment.

This process configuration results in an increased BOD load to the treatment plant and thus increased oxygen requirement. However, the advantages in terms of improved sludge handling and disposal are significant. Faster dewatering can be achieved due to a lower fraction of biomass in combined mill sludge, and a decreased sludge tonnage for disposal.

Thus in a particular embodiment there is provided a process for reducing the production of waste activated sludge while reducing the nutrient and alkali requirements of a microbial mass employed in the generation of the activated sludge from a pulp effluent comprising:

i) feeding a pulp effluent containing suspended solids to a primary clarifier and separating a clarified effluent from suspended solids in said primary clarifier, ii) feeding said clarified effluent to a digestion vessel housing a microbial mass for digestion of pulp effluent residues in said clarified effluent and generation of an activated sludge, iii) microbially digesting pulp effluent residues in said digestion vessel under aerobic conditions at a neutral pH, iv) removing a digestion effluent containing activated sludge from said digestion vessel, v) settling suspended activated sludge solids from said digestion effluent in a secondary clarifier, vi) removing the settled activated sludge from said secondary clarifier in a sludge discharge line, vii) recycling at least a portion of said activated sludge along a recycle line from said discharge line to said digester vessel, viii) feeding an acidic pulp mill effluent into said recycle line and maintaining said acidic effluent and said activated sludge in contact in said recycle line to suppress cell growth in said sludge, render viable cells of said sludge non-viable and degrade non-viable cells with evolution of carbon dioxide, ammonia and water, and ix) recovering a waste sludge from said discharge line.

In particular, this preferred embodiment preferably includes recycling activated sludge in a plurality of cycles from said digester vessel to said secondary clarifier to said discharge line to said recycle line and back to said digester vessel as a recycled sludge and wherein step x) comprises bleeding a portion of recycled sludge from said discharge line as waste sludge.

By means of the present invention a reduction in tonnage of waste activated sludge is achieved thereby permitting an improvement in dewatering efficiency as well as the sludge tonnage for disposal with consequent decrease in sludge handling costs.

DESCRIPTION OF PREFERRED EMBODIMENTS WITH REFERENCE TO THE DRAWINGS

Figure 1:
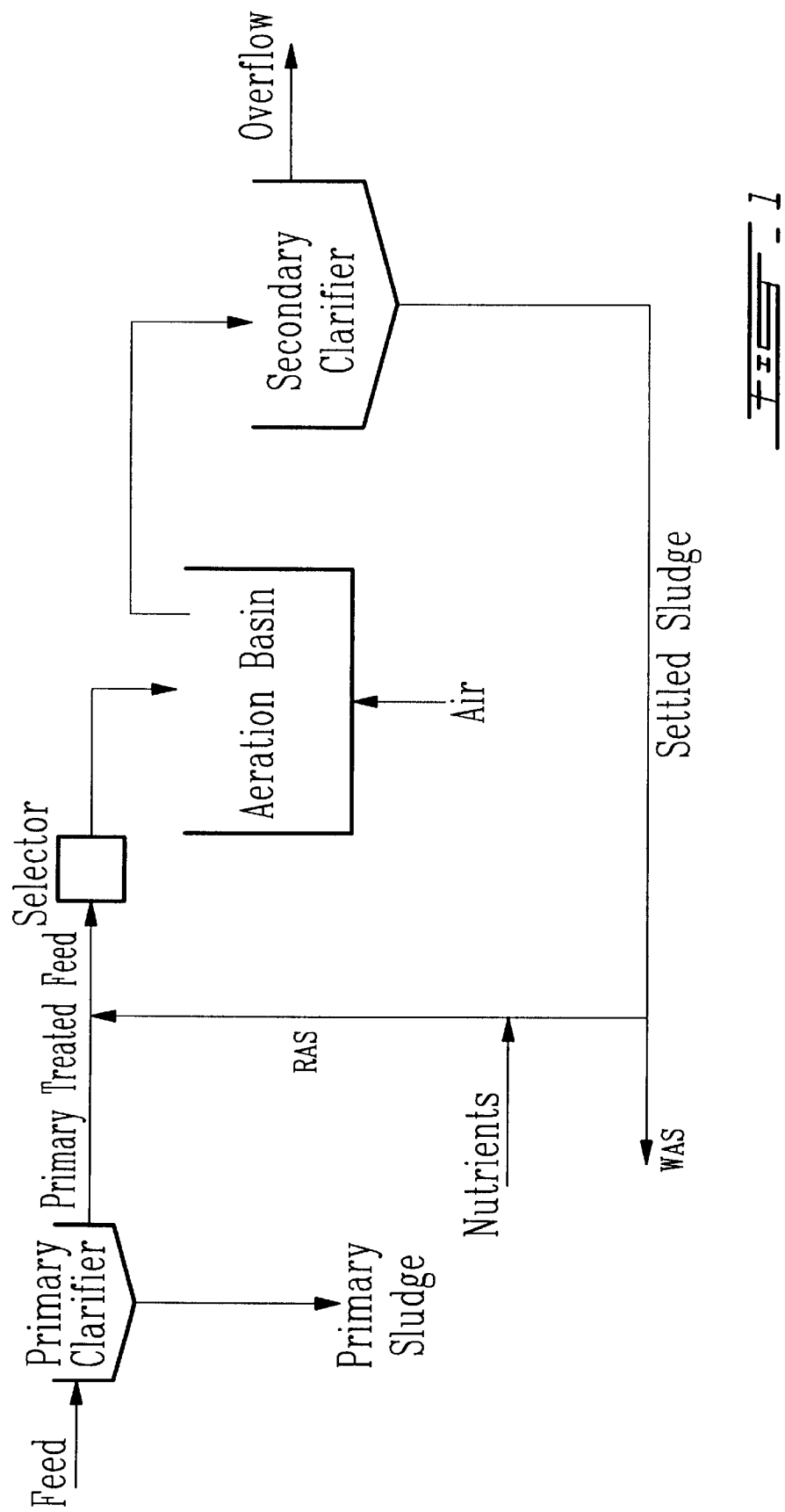
FIG. 1 is a schematic representation of a conventional activated sludge treatment process.

As shown in FIG. 1 a feed 10 of effluent from a pulp mill is charged through a primary clarifier 12 to remove suspended solids, such as fibres. The settled solids are withdrawn as a primary sludge 14 from the clarifier 12 for disposal or reclamation. A feed 16 of clarified primary effluent then enters the aeration stage of the treatment process. A selector 18 commonly used for promoting the growth of floc-forming bacteria receives the effluent feed 16, the return activated sludge (RAS) 20 from the secondary clarifier 22 and supplements of nitrogen and phosphorus nutrients 24 needed for the biochemical process. The mixture then enters an aeration basin 26 where an oxygen-containing gas 28, for example, air or oxygen gas is injected to maintain the dissolved oxygen concentration in basin 26 between 0.5 and 4.0 mg/L. Dispersed in the aqueous medium in basin 26 are biologically-active microorganisms which normally form settleable flocs. The mixed liquor suspended solids (MLSS) in the aeration stage in basin 26 can range between 1000 and 10,000 mg/L. The hydraulic retention time (HRT) in basin 26 is dependent on the required time for a sufficient degradation of the organic load in the system, and varies typically between 4 and 36 hours.

After completion of the biochemical reaction in basin 26, the mixed liquor flows into the secondary clarifier 22 to separate the suspended material from the biologically-treated effluent. The decanted treated effluent 30 then overflows from the clarifier 22 for discharge. The settled sludge 32 separated from the purified effluent collects at the bottom of the clarifier 22. The settled sludge is withdrawn from the secondary clarifier 22 and a part of this sludge provides the (RAS) 20 which is recirculated back to the aeration basin 26 along recycle line 34 and the selector 18. The remainder of sludge 32 is purged from the system as waste activated sludge (WAS) 36. The WAS 36 is usually dewatered before being disposed.

This invention particularly pertains to conditioning the portion 20 of sludge that is returned to the aeration basin 26 along recycle line 34.

Figure 2:
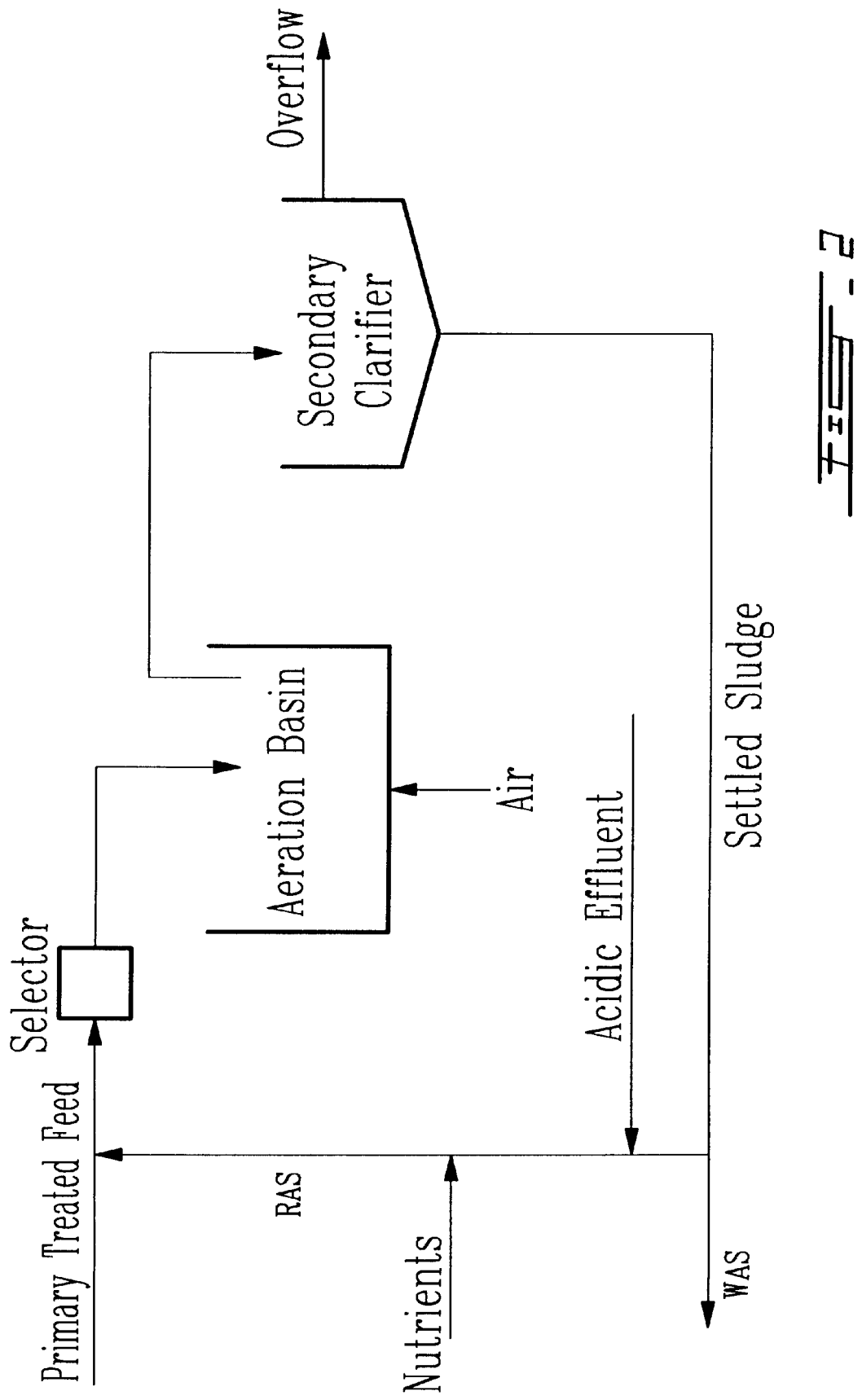
FIG. 2 is a schematic representation of the RAS conditioning system utilizing an acidic effluent of the invention.

In accordance with the invention as illustrated in FIG. 2 the RAS 20 is exposed to an acidic effluent 38 of kraft or sulphite mill. At low pH, a portion of the RAS is rendered non-viable and the immobilized and/or damaged cells are subsequently degraded in the aeration basin 26. The flow of the acidic effluent 38 into the RAS recycle line 34 may be varied dependant on its pH, temperature and concentration of destabilizing agents, such as residual chlorine compounds that are often present in the acid bleach effluent. A holding chamber (not shown) for the RAS 20 and acidic effluent 38 may be disposed in recycle line 34 if the contact time within the recycle line 34 proves to be insufficient.

The following examples serve to illustrate the invention.

EXAMPLE 1

Two laboratory scale activated sludge units, including a reference or control system and an experimental or test system, were established to treat combined bleached kraft mill effluent (BKME) from softwood (SW) operation. The experimental systems employs the process of the invention.

Both systems were operated for a period of 25 days. The reference unit operated in a conventional manner, while the experimental unit had sludge conditioning of the RAS in accordance with the invention. The experimental system was equipped with a heated conditioning chamber, in which the RAS was combined with a first-stage effluent from softwood kraft bleaching (100% $ClO_2$ substitution). The conditioning was performed for 40 minutes a temperature of 50° C. and a pH of 6. The temperature in the heated chamber was adjusted so as to represent the actual temperature of the combined mixture under mill conditions i.e. temperatures of 30–35° C. and 55–60° C., for the RAS and first-stage bleaching effluent, respectively.

The daily sludge yield of the two laboratory systems during 4-day baseline operations was 4.2 g/day (Table I) indicating that both systems produced identical amounts of sludge when operated in the conventional manner. The sludge production in the reference system marginally decreased to 3.9 g/day over the three-week trial period following the baseline test (cumulative production, 83 g dry weight of sludge). A significant decrease in sludge production was demonstrated in the experimental system equipped with sludge conditioning of the invention. There was a 48% decrease in sludge production (Table I) as compared to the reference system, corresponding to a daily sludge production rate of 2.0 g/d (cumulative production, 43 g dry weight of sludge).

Sludge conditioning also allowed for a reduced charge of $NH_3$ nutrient to the experimental system. The average $NH_3$ concentrations in the overflows from the reference and experimental systems during the baseline operations were comparable (0.3–0.8 mg/L). Increases in $NH_3$ residuals were observed in the reference and experimental overflows during the trial period (2.0 mg/L and 24.6 mg/L, respectively). At the mid-point of the study (day 10), the dosage of $NH_4HCO_3$ nutrient to the experimental system was reduced by 50%, to a BOD:N:P ratio of 100:2.5:1. The residual $NH_3$ in the treated effluent of the experimental system to the end of the run was 4.7 mg/L, which indicates that a further decrease of the NH3 nutrient dose is possible. Such reduction in nutrient supplement requirement represents a net cost benefit of the process.

EXAMPLE 2

A pilot plant trial using two activated sludge systems (aeration volume 1.1 m$^3$) was conducted at a bleached kraft mill using a hardwood furnish. The acid conditioning of RAS with first-stage effluent (70% $CLO_2$ substitution) from pulp bleaching was used to reduce sludge production. As in Example 1, the control system was operated in a conventional manner. The acidic effluent was separated from the combined bleached kraft mill effluent (BKME), adjusted to pH of 7 and added to the feed line in the control system.

In the experimental system, the acidic effluent was added into the sludge return line without pH adjustment to produce a pH of 3 in the RAS. The pH within the experimental aeration tanks was maintained at 7.0 by directly adding NaOH into the first aeration tank. Nutrients for the two systems (ratio BOD:N:P of 100:5:1), were dosed in the form of urea-ammonium nitrate (UAN) and a polyphosphate. The dosing of UAN in the experimental system during the trial period was dependent on the residual concentrations found in the overflow. The residual $NH_3$ in the overflow was set at 0.5 g/L, and the dosing was discontinued when concentrations exceeded this set point.

The pilot plant trials began with a baseline period (4 days) in which both the reference and experimental systems were operated identically, without sludge conditioning in the latter system. The baseline period was used to demonstrate that both systems produced comparable amounts of biomass when operated identically. This was achieved by having all the first-stage acidic effluent entering both systems with the feed. The pH of the acid effluent was adjusted to 7.0 before its introduction in the pilot plant systems.

Figure 3:
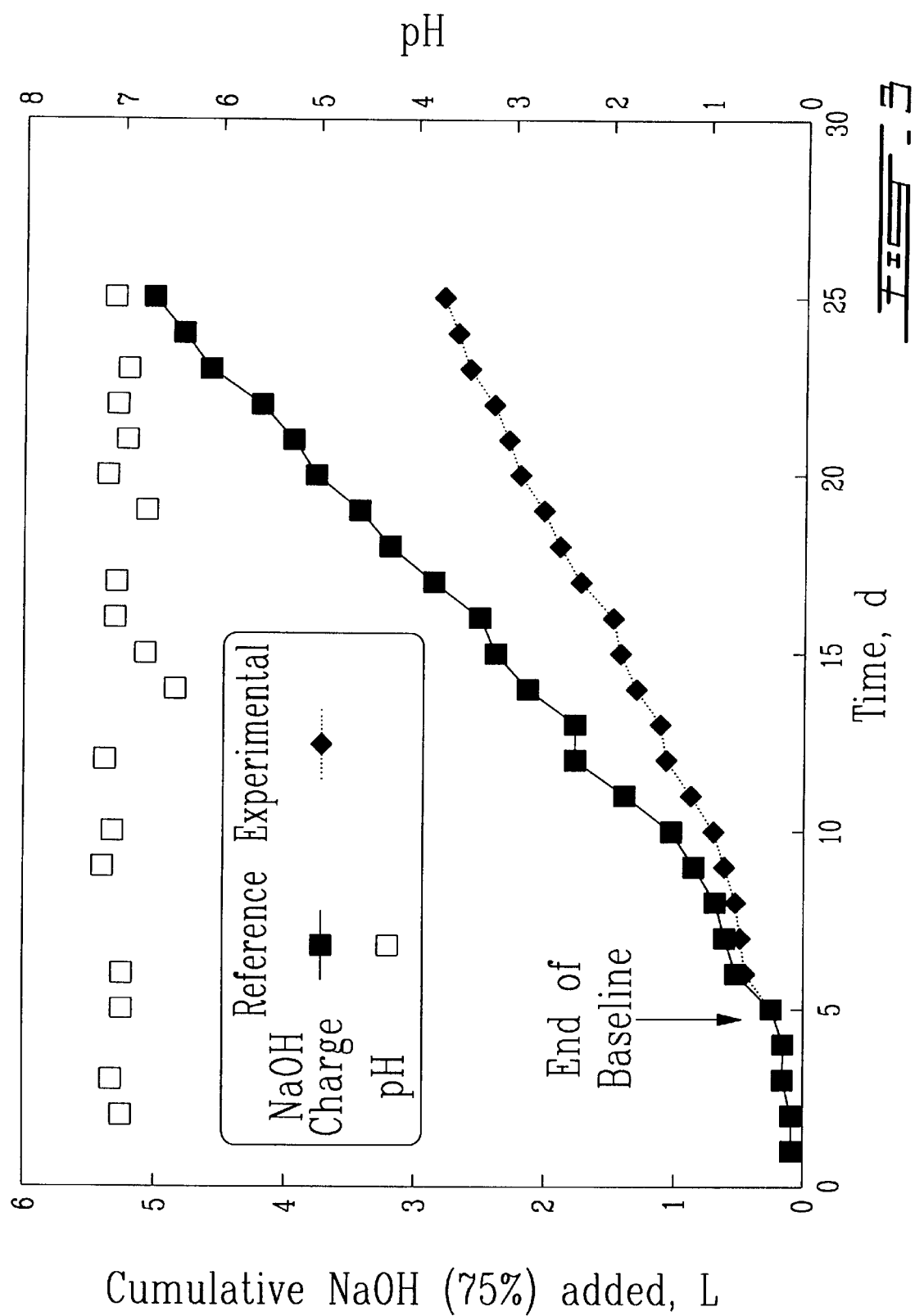
FIG. 3 depicts graphically the reduction in neutralization (alkalinity) requirements resulting from the acid conditioning process of the invention.
Figure 4:
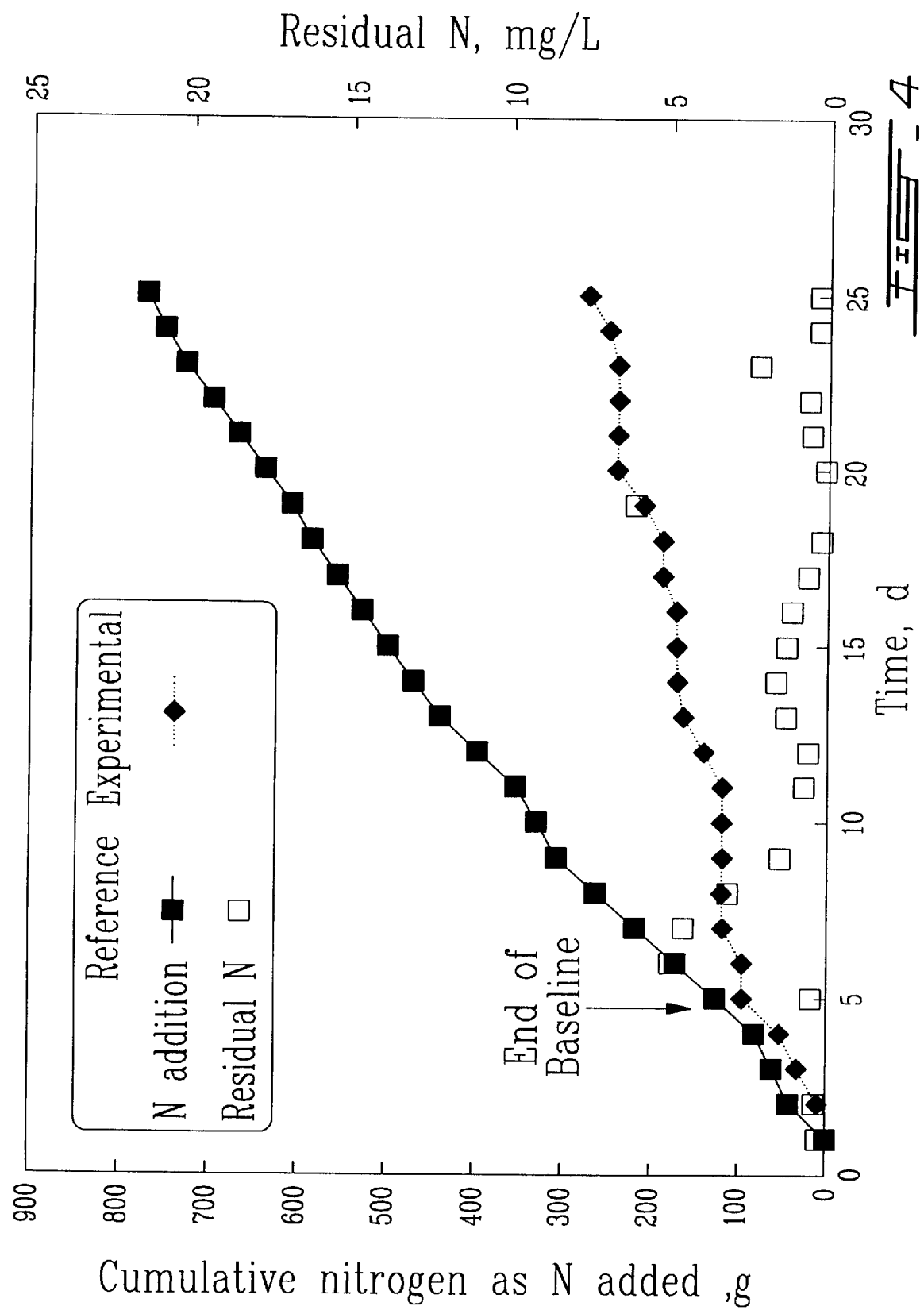
FIG. 4 illustrates graphically the reduction in nitrogen nutrient requirement resulting from the acid conditioning of RAS in accordance with the invention.

Once the trial period began, the supply of acidic bleaching effluent to the experimental system was directed to the sludge return line. A 26% reduction (Table I) in sludge production was found when treating these hardwood bleach plant effluents (70% $ClO_2$ substitution) over a 21 day trial period. An added benefit of conditioning was a 41% reduction in required alkalinity for the treatment system (FIG. 3). The equivalent of one third the required dose of $NH_3$ for the reference pilot system was sufficient for the experimental system (FIG. 4), representing a significant reduction in nutrient costs for the activated sludge treatment process. The conditioning process did not adversely affect the treatment efficiency in terms of BOD and COD (Table I).

EXAMPLE 3

A CTMP/Low-Yield sulphite mill effluent was treated in two laboratory activated sludge units. One unit was operated in a conventional manner and acted as the reference system. A second identical unit ran as the experimental unit in which the RAS in the recycled line was conditioned with an acidic effluent (FIG. 3). Nutrients were supplied in the form of $NH_4 HCO_3$ and $Na_2 HPO_4$. The mill had a bleached sulphite component in its operation which provided the acidic bleach plant effluent. This effluent came from a discharge sewer from sulphite bleaching. The exposure of the RAS to the acidic effluent resulted in a RAS pH of 3. The contact time in the sludge line was between 2–5 minutes. Both systems operated at a HRT of 36 hours with insignificant differences in systems performance in terms of BOD and COD removals. During the 12 day trial run, there was 30% less (Table II) sludge generated in the conditioned system as compared to the reference system (2.79 g/d vs. 1.94 g/d). Residual $NH_3$ concentrations were 3 fold higher in the experimental overflow than in the reference system suggesting a possible savings in supplemental nutrient costs for the treatment system. The BOD and COD removal efficiencies of the acid conditioning process were comparable to those of the conventional process (Table II).

EXAMPLE 4

A pilot plant trial using two activated sludge systems (aeration volume 1.1 $m^3$) was conducted at a CTMP/Low-Yield sulphite mill. The acid conditioning of RAS was performed by a mixture of acidic effluents from sulphite bleaching which resulted in reduce sludge production (16%) as compared to a conventionally operated system (Table II). The acidic effluent had a pH of 2.1 and was neutralized to 7 before its addition to both systems during the baseline period (8 days). Adjusted acidic effluent continued to be added to the feed line in the control system during the trial period (24 days) while the test system received the acidic effluent via the sludge return line. The pH within the experimental aeration tanks was maintained at 7.0 by directly adding NaOH into the first aeration tank. Nutrients for the two systems (ratio BOD:N:P of 100:5:1), were dosed in the form of urea and phosphoric acid. The treatment efficiencies in terms of BOD and COD removals for the control and test systems were comparable.

EXAMPLE 5

Two 9.3 litre activated sludge laboratory units treated effluent from a kraft pulp mill. The control unit functioned as a conventional system, and the other as the experimental test system. Both systems were fed untreated effluent. The effluent was alkali which required neutralization to render it acidic prior to its entering the full-scale treatment plant. The mill neutralized the effluent by adding an acid stream containing sulphuric acid. The two laboratory systems also received this neutralization stream, it was added with the feed in the control system, and in the RAS for the experimental system. Nutrients were added to the feed in the BOD:N:P ratio of 100:5:0.7. The trial ran for 30 days. The operational parameters can be found in Table III. A baseline period (12d) was used to establish that the systems were comparable in terms of sludge production. Both systems had the neutralizing acidic stream mixed in with the feed. The systems produced 1.9 g/d of new biomass. During the trial run, when the acidic neutralization stream was directed to the RAS line, the experimental system had a daily sludge production of 1.45 g while the control system produced 1.74 g. The amount of acid that was needed was equivalent to 1 kg acid per 25 kg of sludge. This dosage resulted in a drop in pH in the RAS line from 7.2 to 3.4. The conditioning process did not adversely affect the treatment efficiency in terms of BOD and COD removals results are shown in Table III.

TABLE I

Sludge Reduction: Bleach Kraft Effluent

| | Acid Conditioning | | | |
|---|---|---|---|---|
| | Control | Test | Control | Test |
| Scale Process Conditions | Lab | Lab | Pilot | Pilot |
| Type of Feed | Softwood | | Hardwood | |
| Aeration Volume, L | 7.5 | 7.5 | 1100 | 1100 |
| Flow, L/day | 13.9 | 14.9 | 1302 | 1323 |
| HRT, h | 13.1 | 12.4 | 20.3 | 19.9 |
| MLSS, mg/L | 3420 | 2820 | 2570 | 2570 |
| DO, mg/L | 4.2 | 4.9 | 3.0 | 3.0 |
| BOD:N:P | 100:5:1 | 100:5:1 | 100:5:1 | |
| Acidic effluent pH | — | 4.2 | — | 1.8 |
| Acidic effluent flow | — | 4.0 | — | 180 |
| Baseline Period | | | | |
| Duration, d | 4 | 4 | 4 | 4 |
| Sludge Yield, g/d | 4.2 | 4.2 | 301 | 299 |
| Reduction, % | — | 0 | — | 0 |
| Trial Period | | | | |
| Duration, d | 21 | 21 | 21 | 21 |
| Sludge Yield, g/d | 3.90 | 2.05 | 340 | 251 |
| Reduction, % | — | 48 | — | 26 |
| BOD Removal, % | 98 | 89 | 94 | 96 |
| COD Removal, % | 57 | 45 | 75 | 74 |
| Residual $NH_2$, mg/L | 2.0 | 24.6 | 1.0 | 1.0 |
| Residual P, mg/L | — | — | — | — |

TABLE II

Sludge Reduction: CTMPI/Low-Yield Sulphite Effluent

| | Acid Conditioning | | | |
|---|---|---|---|---|
| | Control | Test | Control | Test |
| Scale Process Conditions | Lab | Lab | Pilot | Pilot |
| Aeration Volume, L | 7.5 | 7.6 | 1100 | 1100 |
| Flow, L/day | 4.5 | 4.5 | 700 | 700 |

TABLE II-continued

Sludge Reduction: CTMPI/Low-Yield Sulphite Effluent

|  | Acid Conditioning | | | |
| --- | --- | --- | --- | --- |
|  | Control | Test | Control | Test |
| HRT, h | 41 | 40 | 37 | 37 |
| MLSS, mg/L | 7133 | 7148 | 6136 | 6270 |
| DO, mg/L | 0.5 | 1.5 | 2.9 | 3.1 |
| BOD:N:P | 100:5:1 | 100:5:1 | 100:5:1 | 100:5:1 |
| Acidic effluent pH | — | 1 | — | 2.1 |
| Acidic effluent flow | — | 0.012 | — | 35 |
| Baseline Period |  |  |  |  |
| Duration, d | 8 | 8 | 8 | 8 |
| Sludge Yield, g/d | 3.82 | 3.62 | 645 | 610 |
| Reduction, % | — | 5 | — | 5 |
| Trial Period |  |  |  |  |
| Duration, d | 12 | 12 | 24 | 24 |
| Sludge Yield, g/d | 2.79 | 1.94 | 550 | 435 |
| Reduction, % | — | 30 | — | 16 |
| BOD Removal, % | 98 | 97 | 97 | 97 |
| COD Removal, % | 69 | 73 | 66 | 66 |
| Residual $NH_2$, mg/L | 6.0 | 17.6 | — | — |
| Residual P, mg/L | — | — | — | — |

TABLE III

Sludge Reduction: Acid Neutralizing Stream

|  | Acid Conditioning | |
| --- | --- | --- |
|  | Control | Test |
| Scale | Lab | Lab |
| Process Conditions |  |  |
| Type of Feed | Softwood |  |
| Aeration Volume, L | 9.3 | 9.3 |
| Flow, L/day | 10.6 | 11.7 |
| HRT, h | 21 | 19 |
| MLSS, mg/L | 1830 | 1840 |
| DO, mg/L | 2.1 | 2.0 |
| BOD:N:P | 100:5:0.7 | 100:5:0.7 |
| Acidic effluent pH | — | 1 |
| Acidic effluent flow | — | 0.015 |
| Baseline Period |  |  |
| Duration, d | 12 | 12 |
| Sludge Yield, g/d | 1.97 | 1.91 |
| Reduction, % | — | 3 |
| Test Period |  |  |
| Duration, d | 18 | 18 |
| Sludge Yield, g/d | 1.74 | 1.45 |
| Reduction, % | — | 17 |
| BOD Removal, % | 94 | 94 |
| COD Removal, % | 46 | 47 |
| Residual $NH_2$, mg/L | 0.52 | 0.98 |
| Residual P, mg/L | — | — |

We claim:

1. A process of treating activated sludge in which a solids-containing pulp or paper mill effluent is charged to a primary clarifier to remove suspended solids with production of a clarified effluent, the clarified effluent is subjected to microbial digestion in a digestion vessel, a digestion effluent from said vessel is clarified and sludge from the clarification is recycled along a recycle line to said digestion vessel, the improvement in which an acidic pulp or paper mill effluent is added to said sludge in said recycle line.

2. A process according to claim 1 in which said acidic effluent is recovered from a bleaching stage in a kraft or sulphite mill.

3. A process according to claim 2 wherein said acidic effluent produces in said sludge in said recycle line a pH of 3 to 6.

4. A process according to claim 3 wherein said pH is 3.

5. A process according to claim 3 wherein said microbial digestion is aerobic and nutrients for the microbial digestion are introduced into said digestion vessel, and said microbial digestion results in formation of nutrients from said sludge.

6. A process according to claim 3 wherein said acidic effluent contains chlorine dioxide and the combined sludge and acidic effluent in said recycle line has a temperature of 35 to 50° C.

7. A process for reducing the production of waste activated sludge while reducing the nutrient and alkali requirements of a microbial mass employed in the generation of the activated sludge from a pulp effluent comprising:

i) feeding a pulp effluent containing suspended solids to a primary clarifier and separating a clarified effluent from suspended solids in said primary clarifier, ii) feeding said clarified effluent to a digestion vessel housing a microbial mass for digestion of pulp effluent residues in said clarified effluent and generation of an activated sludge, iii) microbially digesting pulp effluent residues in said digestion vessel under aerobic conditions at a neutral pH, iv) removing a digestion effluent containing activated sludge from said digestion vessel, v) settling suspended activated sludge solids from said digestion effluent in a secondary clarifier, vi) removing the settled activated sludge from said secondary clarifier in a sludge discharge line, vii) recycling at least a portion of said activated sludge along a recycle line from said discharge line to said digester vessel, viii) feeding an acidic pulp mill effluent into said recycle line and maintaining said acidic effluent and said activated sludge in contact in said recycle line to suppress cell growth in said sludge, render viable cells of said sludge non-viable and degrade non-viable cells with evolution of carbon dioxide, ammonia and water, and ix) recovering a waste sludge from said discharge line.

8. A process according to claim 7 including recycling activated sludge in a plurality of cycles from said digester vessel to said secondary clarifier to said discharge line to said recycle line and back to said digester vessel as a recycled sludge and wherein step x) comprises bleeding a portion of recycled sludge from said discharge line as waste sludge.

9. A process according to claim 8 wherein said acidic effluent is from a bleaching stage in a kraft or sulphite pulp mill.

10. A process according to claim 8 wherein the combination of acidic effluent and activated sludge in said recycle line has a pH of 3 to 6 and a temperature of 35 to 50° C.

11. A process according to claim 10 wherein step iii) is carried out for a hydraulic retention time of 4 to 36 hours.

12. A process according to claim 11 wherein step viii) comprises maintaining said acidic effluent in contact with said activated sludge for 2 to 40 minutes.

* * * * *